United States Patent
Mawatari (10) Patent No.: US 12,484,731 B2
(45) Date of Patent: Dec. 2, 2025

(54) AUTOMATED COOKING DEVICE

(71) Applicant: TECHMAGIC INC., Tokyo (JP)

(72) Inventor: Shohei Mawatari, Tokyo (JP)

(73) Assignee: TECHMAGIC INC. (JP)

( * ) Notice: Subject to any disclaimer, the term of this patent is extended or adjusted under 35 U.S.C. 154(b) by 0 days.

(21) Appl. No.: 19/179,273

(22) Filed: Apr. 15, 2025

(65) Prior Publication Data

US 2025/0318681 A1    Oct. 16, 2025

(51) Int. Cl.
*A47J 36/16* (2006.01)
*A47J 27/14* (2006.01)
*A47J 44/00* (2006.01)

(52) U.S. Cl.
CPC .............. *A47J 36/165* (2013.01); *A47J 27/14* (2013.01); *A47J 44/00* (2013.01)

(58) Field of Classification Search
CPC .......... A47J 36/00; A47J 36/165; A47J 27/14; A47J 27/00; A47J 37/108; B08B 9/087; B08B 9/38
USPC ........................................................... 99/348
See application file for complete search history.

(56) References Cited

U.S. PATENT DOCUMENTS

| | | | | |
|---|---|---|---|---|
| 4,700,617 | A * | 10/1987 | Lee | A47J 27/14 99/335 |
| 6,843,166 | B1 * | 1/2005 | Li | A47J 27/14 99/332 |
| 8,066,427 | B2 * | 11/2011 | Wong | B01F 27/70 366/279 |
| 2023/0061171 | A1 | 3/2023 | Sijm et al. | |

FOREIGN PATENT DOCUMENTS

| | | | |
|---|---|---|---|
| CN | 103126513 A | 6/2013 | |
| CN | 109106201 A | 1/2019 | |
| CN | 110558819 A * | 12/2019 | ............ A47J 36/165 |
| CN | 110710862 A | 1/2020 | |
| CN | 111035239 A * | 4/2020 | ............. A47J 36/00 |
| CN | 214595457 U | 11/2021 | |
| CN | 217451357 U | 9/2022 | |
| CN | 116114839 A | 5/2023 | |
| JP | 3227512 U | 8/2020 | |
| WO | 2021024124 A1 | 2/2021 | |

* cited by examiner

*Primary Examiner* — Reginald Alexander
(74) *Attorney, Agent, or Firm* — Billion & Armitage (57) ABSTRACT

[Problem] To provide an automated cooking device which can efficiently scrape off a dirt, such as a burn sticking to an inner wall surface of a cooking container due to heating and cooking and remaining there after cooking.

[Solution] An automated cooking device 10 comprising: a cooking counter 100 including a sink for washing 110; a container holding unit 200 configured to hold a cooking container 300 rotatably around a container central axis AC; and a scraping unit 600 configured to wash an inner wall surface of the cooking container while the cooking container is turned upside down after stirring and cooking an ingredient I contained in the cooking container, the scraping unit 600 including a scraper 630 configured to scrape off a dirt B, such as a burn adhering to the cooking container and being configured to be enclosed by the inner wall surface upside down of the cooking container in the sink for washing and allow the inner wall surface of the cooking container and the scraper to abut against each other.

5 Claims, 9 Drawing Sheets

AUTOMATED COOKING DEVICE

TECHNICAL FIELD

The present invention relates to an automated cooking device which heats and cooks an ingredient at a high temperature automatically, and particularly to an automated cooking device which can scrape off during washing of a cooking container a burnt dirt apt to stick to an inner wall surface of the cooking container during heating and cooking.

BACKGROUND ART

There has been hitherto known an automated cooking device in which a cooking container is turned upside down above a sink for washing and then water from a washing nozzle is sprayed from below to wash the interior of the cooking container. (see Patent Literature 1 and Patent Literature 2).

PRIOR ART DOCUMENT

Patent Literature

Patent Literature 1: WO2021/024124A1
Patent Literature 2: JP3227512U

SUMMARY OF INVENTION

Technical Problem

However, in the above-mentioned conventional automated cooking device, there is such a problem that it is difficult to scrape off by merely washing by means of spraying water from the washing nozzle a burnt dirt apt to stick to the inner wall surface of the cooking container during heating and cooking at a high temperature, for example, Chinese food.

Thus, the present invention is to solve the problem of the prior art as described above. In other words, it is an object of the present invention to provide an automated cooking device which efficiently scrapes off a dirt, such as a burn sticking to an inner wall surface of the cooking container due to heating and cooking and remaining there after cooking.

Solution to Problem

The invention according to claim 1 is to solve the above problem by An automated cooking device comprising: a container holding unit provided on an upper portion of a cooking counter and configured to hold a bottomed cylindrical cooking container rotatably around a container central axis in a container depth direction; and a sink for washing provided in an area of the cooking counter forward of a rise-and-fall shaft portion of the container holding unit and configured to wash the cooking container, the automated cooking device being configured to heat and cook an ingredient contained in the cooking container while stirring the same, and then wash an inner wall surface of the cooking container while the cooking container is turned upside down, in which a scraping unit including a scraper configured to scrape off a dirt adhering to the cooking container after cooking is provided in such a manner as to be enclosed by the inner wall surface upside down of the cooking container in the sink for washing and allow the inner wall surface of the cooking container and the scraper to abut against each other, the cooking container has a container body configured to contain the ingredient and a stir member attached to the container body and configured to rotate independently of the container body, the container holding unit allows the stir member to rotate independently of the container body, and the scraping unit is arranged outside of a movable range of the stir member during washing.

The invention according to claim 2 of the present application is to solve the above problem by an automated cooking device comprising: a container holding unit provided on an upper portion of a cooking counter and configured to hold a bottomed cylindrical cooking container rotatably around a container central axis in a container depth direction; and a sink for washing provided in an area of the cooking counter forward of a rise-and-fall shaft portion of the container holding unit and configured to wash the cooking container, the automated cooking device being configured to heat and cook an ingredient contained in the cooking container while stirring the same, and then wash an inner wall surface of the cooking container while the cooking container is turned upside down, in which a scraping unit including a scraper configured to scrape off a dirt adhering to the cooking container after cooking is provided in such a manner as to be enclosed by the inner wall surface upside down of the cooking container in the sink for washing and allow the inner wall surface of the cooking container and the scraper to abut against each other, and a placement unit including a board for plating on which a plate on which the ingredient cooked in the cooking container is to be plated up is placed is provided near the sink for washing such that the board for plating can slide between an open position at which the board for plating leaves an opening portion of the sink for washing open and a closed position at which the board for plating is spanned across the opening portion of the sink for washing and an opening and closing movement of the board for plating relative to the opening portion of the sink for washing causes the scraper to stand up at the open position and the scraper to lie down at the closed position.

The invention according to claim 3 of the present application is to further solve the above problem by, in addition to the features of the automated cooking device according to claim 2, the features in which the scraper of the scraping unit assumes a standing posture due to an elastic force of a spring for standing of the four-joint cross link mechanism with a spring when the board for plating is at the open position and assumes a lying posture against an elastic force of the spring for standing of the four-joint cross link mechanism with a spring when the board for plating is at the closed position.

The invention according to claim 4 of the present application is to further solve the above problem by, in addition to the features of the automated cooking device according to claim 1 or claim 2, the features in which the cooking container has an inclined surface portion to be heated inclined relative to the container central axis, and the scraper has an inclined side portion configured to abut against an inner wall surface of the inclined surface portion to be heated of the container body.

The invention according to claim 5 of the present application is to further solve the above problem by, in addition to the features of the automated cooking device according to claim 1 or claim 2, the features in which the scraping unit is configured to be detachably attached to the sink for washing.

Effects of Invention

According to the automated cooking device of the invention according to claim 1 of the present invention, an automated cooking device comprising: a container holding unit provided on an upper portion of a cooking counter and configured to hold a bottomed cylindrical cooking container rotatably around a container central axis in a container depth direction; and a sink for washing provided in an area of the cooking counter forward of a rise-and-fall shaft portion of the container holding unit and configured to wash the cooking container, the automated cooking device being configured to heat and cook an ingredient contained in the cooking container while stirring the same, and then wash an inner wall surface of the cooking container while the cooking container is turned upside down, so that not only it is possible to wash the inner wall surface of the cooking container after automated cooking, but also distinct configurations according to the present invention as described below produce effects distinctive of the present invention.

First, a scraping unit including a scraper configured to scrape off a dirt adhering to the cooking container after cooking is provided in such a manner as to be enclosed by the inner wall surface upside down of the cooking container in the sink for washing and allow the inner wall surface of the cooking container and the scraper to abut against each other, so that when the cooking container upside down is rotated around the container central axis in the cooking container depth direction, the entire circumference of the inner wall surface of the cooking container sequentially comes into contact with the scraper, and thus a dirt, such as a burn sticking to an inner circumferential surface of the cooking container after cooking can be efficiently scraped off.

Further, the scraping unit is surrounded by the inner wall surface upside down of the cooking container in the sink for washing, so that a dirt, such as a burn scraped off by the scraper after cooking falls down from inside the cooking container into the sink for washing without scattering on the upper surface of the cooking counter, and accordingly, a dirt, such as a burn scraped off can be easily collected after washing.

Moreover, the cooking container has a container body configured to contain the ingredient and a stir member attached to the container body and configured to rotate independently of the container body, the container holding unit allows the stir member to rotate independently of the container body, and the scraping unit is arranged outside of a movable range of the stir member during washing, so that in the washing posture in which the cooking container is turned upside down facing the sink for washing and rotated by the container rotating mechanism so as to be washed, the stir member and the scraping unit are always positioned spaced apart from each other, which prevents damage due to contact between the stir member and the scraping unit, and the clearance between the stir member and the scraping unit allows for high maintainability. Even if the stir member stops at some position due to an emergency stop for some reason during washing in which the cooking container is turned upside down in the washing posture, the cooking container can be returned from the washing posture to a cooking posture, and recovery work can be carried out while no interference between the stir member and the scraping unit is caused.

According to the automated cooking device of the invention according to claim 2 of the present invention, an automated cooking device comprising: a container holding unit provided on an upper portion of a cooking counter and configured to hold a bottomed cylindrical cooking container rotatably around a container central axis in a container depth direction; and a sink for washing provided in an area of the cooking counter forward of a rise-and-fall shaft portion of the container holding unit and configured to wash the cooking container, the automated cooking device being configured to heat and cook an ingredient contained in the cooking container while stirring the same, and then wash an inner wall surface of the cooking container while the cooking container is turned upside down, so that not only it is possible to wash the inner wall surface of the cooking container after automated cooking, but also distinct configurations according to the present invention as described below produce effects distinctive of the present invention.

First, a placement unit including a board for plating on which a plate on which the ingredient cooked in the cooking container is to be plated up is placed is provided such that the board for plating can slide between an open position at which the board for plating leaves an opening portion of the sink for washing open and a closed position at which the board for plating is spanned across the opening portion of the sink for washing, which allows the area of the cooking counter forward of the container holding unit to have both a scraping function by the scraping unit in the sink for washing and a dish placement function by the board for plating spanned across the sink for washing, which can make the entire device compact.

Further, the placement unit is provided near the sink for washing such that an opening and closing movement of the board for plating relative to the opening portion of the sink for washing causes the scraper to stand up at the open position and the scraper to lie down at the closed position, so that when the board for plating is slid to the open position, the scraper protrudes upward from the sink for washing, and consequently the scraper reliably comes into contact with the inner wall surface upside down of the cooking container, thereby being capable of reliably scraping off a dirt, such as a burn adhering to the inner wall surface of the cooking container.

Moreover, the scraper is stored under the board for plating when the board for plating is slid to the closed position, so that a plate can be placed stably on the board for plating and accordingly plating work can be efficiently carried out.

According to the automated cooking device of the invention according to claim 3 of the present invention, the scraping unit has a four-joint cross link mechanism with a spring, and the scraper of the scraping unit assumes a standing posture due to an elastic force of a spring for standing of the four-joint cross link mechanism with a spring when the board for plating is at the open position, so that when the board for plating is slid to the open position, an elastic force of the spring for standing causes the scraping unit to elastically abut against the inner wall surface of the cooking container and assume the standing posture for scraping off a dirt, such as a burn. Thus, a preparation for scraping off a dirt, such as a burn can be smoothly made by merely sliding the board for plating to the open position.

Further, in the standing position, the scraper is elastically pressed due to an elastic force of the spring for standing against the inner wall surface of the cooking container in the washing posture, so that a dirt, such as a burn sticking to the inner wall surface of the cooking container can be scraped off more reliably and an excessive relative sliding state of the scraper against the inner wall surface of the cooking container can be avoided to suppress wear thereof and damage thereto.

Moreover, the scraping unit has a four-joint cross link mechanism with a spring, and the scraper of the scraping unit assumes a lying posture against an elastic force of the spring for standing of the four-joint cross link mechanism with a spring when the board for plating is at the closed position, so that when the board for plating is slid to the closed position, the scraper of the scraping unit assumes the lying posture against the spring for standing. Thus, the scraping unit is stored under the board for plating by merely sliding the board for plating to the closed position, and a plate can be placed stably on the board for plating and accordingly plating work can be further efficiently carried out.

According to the automated cooking device of the invention according to claim 4 of the present invention, the cooking container has an inclined surface portion to be heated inclined relative to the container central axis, and the scraper has an inclined side portion configured to abut against an inner wall surface of the inclined surface portion to be heated of the container body, so that when the cooking container is rotated around the container central axis in the depth direction in the washing posture, the inclined side portion of the scraper abuts against the entire circumference of the inner wall surface of the inclined surface portion to be heated of the cooking container, and thus a dirt, such as a burn firmly sticking to the inner wall surface of the cooking container due to heating and cooking can be efficiently scraped off.

According to the automated cooking device of the invention according to claim 5 of the present invention, the scraping unit is configured to be detachably attached to the sink for washing, so that the scraping unit can be detached after scraping off a dirt, such as a burn and accordingly a dirt, such as a burn scraped off by the scraper and falling down into the sink for washing can be easily collected and the detached scraping unit can be easily washed.

DESCRIPTION OF EMBODIMENTS

The present invention may be embodied in any way as long as an automated cooking device comprises: a container holding unit provided on an upper portion of a cooking counter and configured to hold a bottomed cylindrical cooking container rotatably around a container central axis in a container depth direction; and a sink for washing provided in an area of the cooking counter forward of a rise-and-fall shaft portion of the container holding unit and configured to wash the cooking container, the automated cooking device being configured to heat and cook an ingredient contained in the cooking container while stirring the same, and then wash an inner wall surface of the cooking container while the cooking container is turned upside down, in which a scraping unit including a scraper configured to scrape off a dirt adhering to the cooking container after cooking is provided in such a manner as to be enclosed by the inner wall surface upside down of the cooking container in the sink for washing and allow the inner wall surface of the cooking container and the scraper to abut against each other, the cooking container has a container body configured to contain the ingredient and a stir member attached to the container body and configured to rotate independently of the container body, the container holding unit allows the stir member to rotate independently of the container body, and the scraping unit is arranged outside of a movable range of the stir member during washing, thereby being capable of efficiently scraping off a dirt, such as a burn sticking to an inner wall surface of a cooking container due to heating and cooking and remaining there after cooking.

Further, the present invention may be embodied in any way as long as An automated cooking device comprises: a container holding unit provided on an upper portion of a cooking counter and configured to hold a bottomed cylindrical cooking container rotatably around a container central axis in a container depth direction; and a sink for washing provided in an area of the cooking counter forward of a rise-and-fall shaft portion of the container holding unit and configured to wash the cooking container, the automated cooking device being configured to heat and cook an ingredient contained in the cooking container while stirring the same, and then wash an inner wall surface of the cooking container while the cooking container is turned upside down, characterized in that a scraping unit including a scraper configured to scrape off a dirt adhering to the cooking container after cooking is provided in such a manner as to be enclosed by the inner wall surface upside down of the cooking container in the sink for washing and allow the inner wall surface of the cooking container and the scraper to abut against each other, and a placement unit including a board for plating on which a plate on which the ingredient cooked in the cooking container is to be plated up is placed is provided near the sink for washing such that the board for plating can slide between an open position at which the board for plating leaves an opening portion of the sink for washing open and a closed position at which the board for plating is spanned across the opening portion of the sink for washing and an opening and closing movement of the board for plating relative to the opening portion of the sink for washing causes the scraper to stand up at the open position and the scraper to lie down at the closed position, thereby being capable of efficiently scraping off a dirt, such as a burn sticking to an inner wall surface of a cooking container due to heating and cooking and remaining there after cooking.

For example, in the automated cooking device according to the present invention, after automated cooking, a cook can manually operate a rise-and-fall handle such that the container holding unit rocks around the rise-and-fall shaft portion and falls forward to place the cooking container in the washing posture in which the cooking container is turned upside down, but a process in which the container holding unit is caused to rock and fall forward such that the cooking container is placed in the washing posture in which the cooking container is turned upside down may be automated.

Note that the term "dirt" to be scraped off by the scraper employed in the present invention refers to a burn of an ingredient or the like apt to stick to the inner wall surface of the cooking container when heating and cooking Chinese food or the like is carried out at a high temperature.

Embodiment 1

In the following, an automated cooking device 10 according to a first embodiment of the present invention will be described with reference to FIG. 1 to FIG. 7.

Figure 1A:
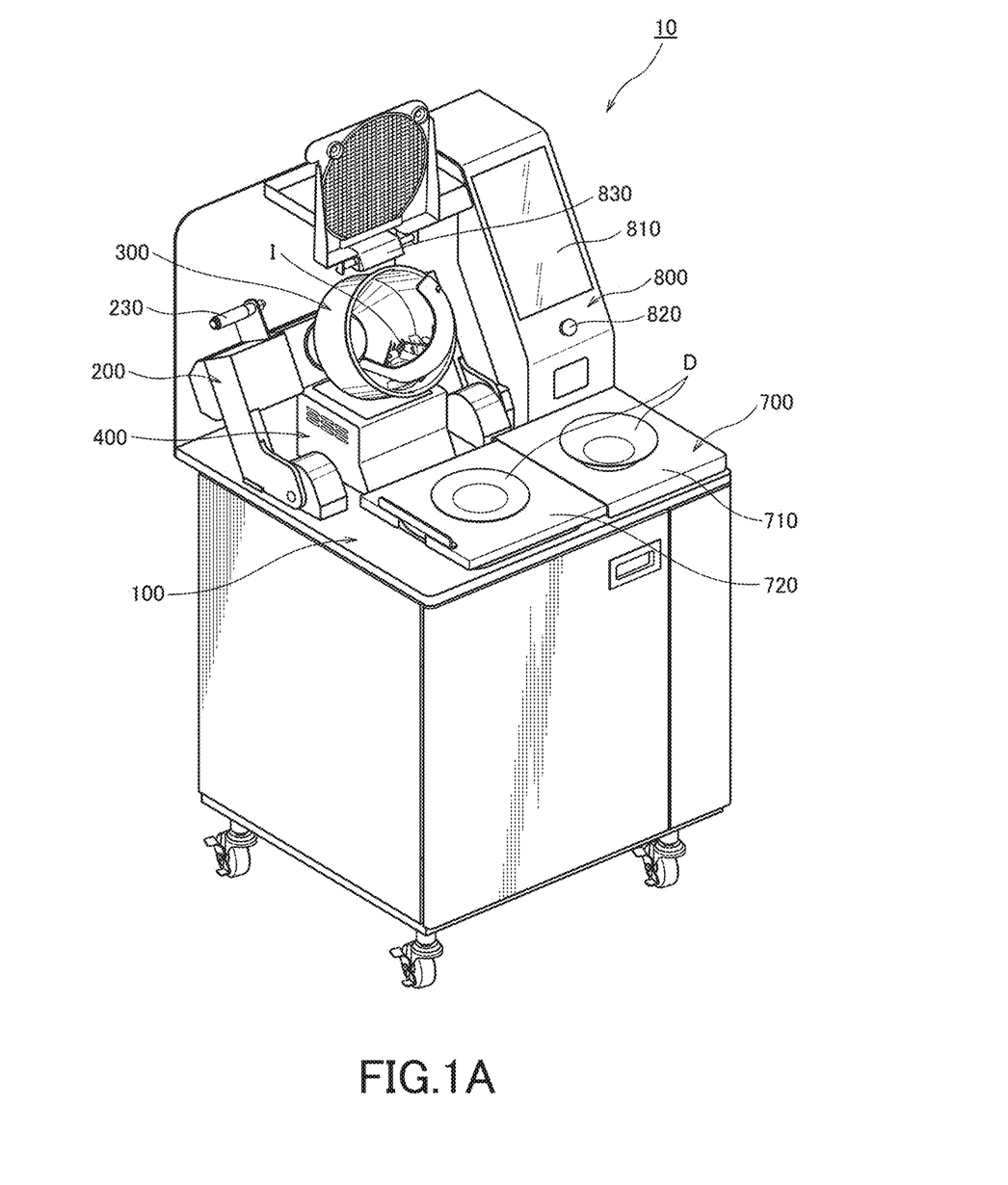
FIG. 1A is a schematic perspective view illustrating a state of an automated cooking device according to the present invention carrying out automated cooking.
Figure 1B:
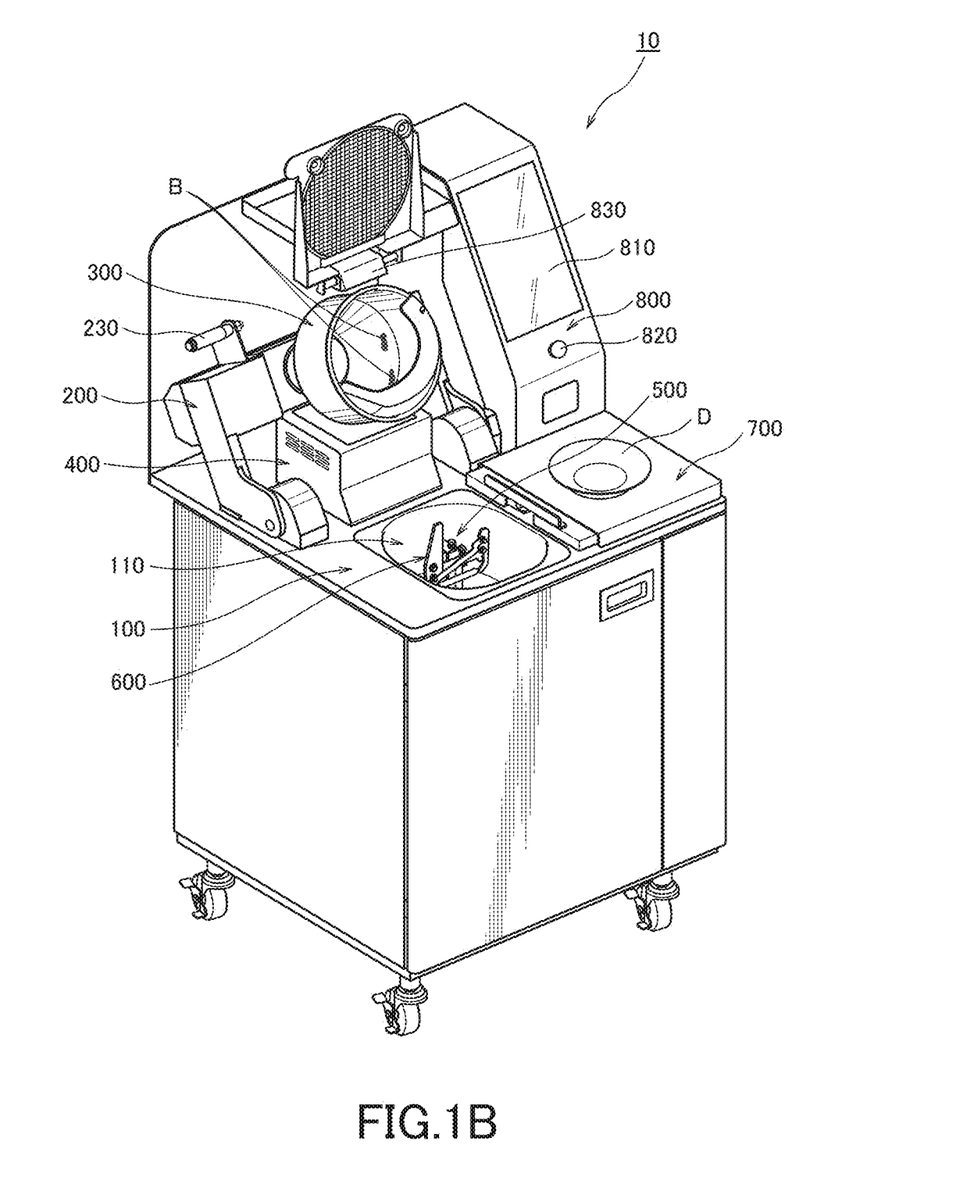
FIG. 1B is a schematic perspective view illustrating a state of the automated cooking device according to the present invention with a sink for washing open.
Figure 2:
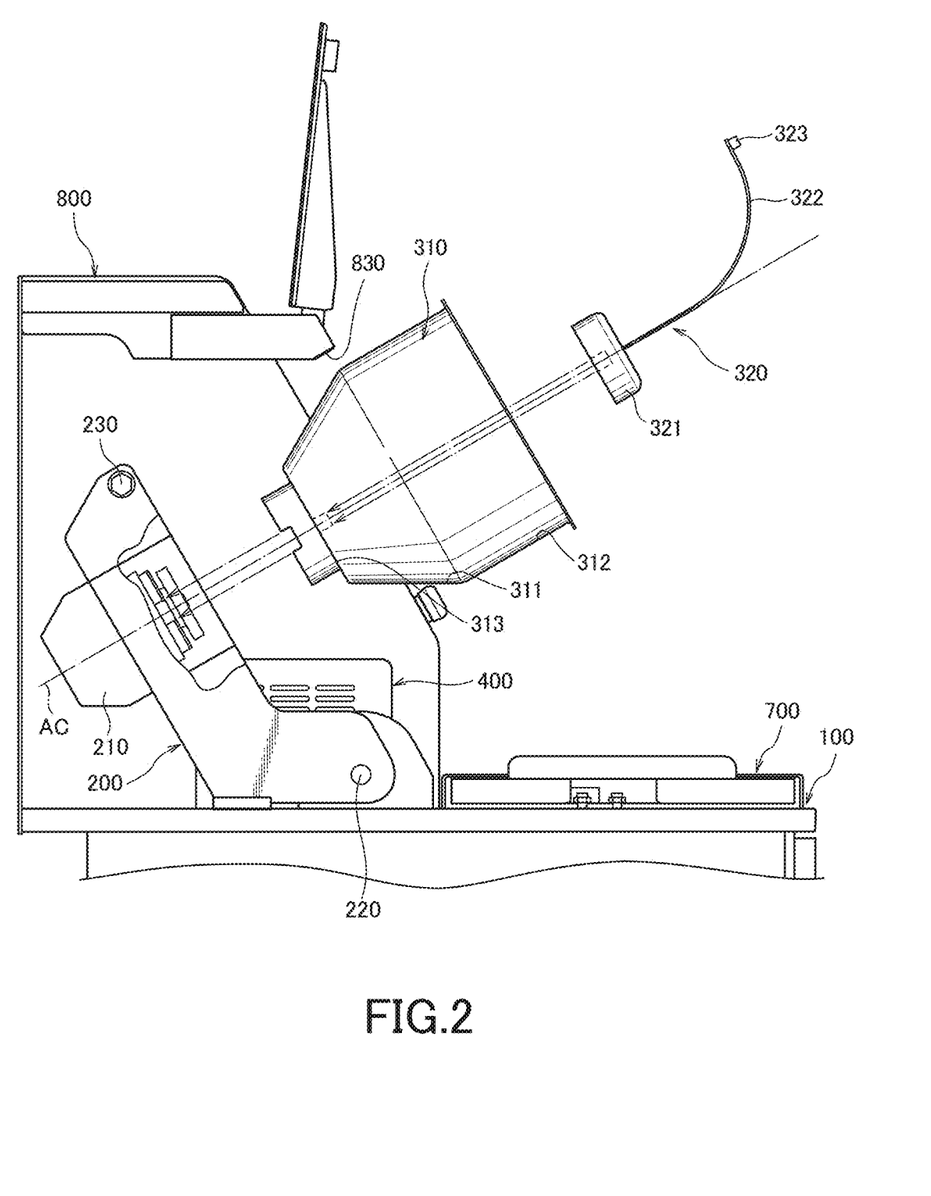
FIG. 2 is a schematic left side view illustrating a way of attaching a cooking container to a container holding unit according to the present invention.
Figure 3A:
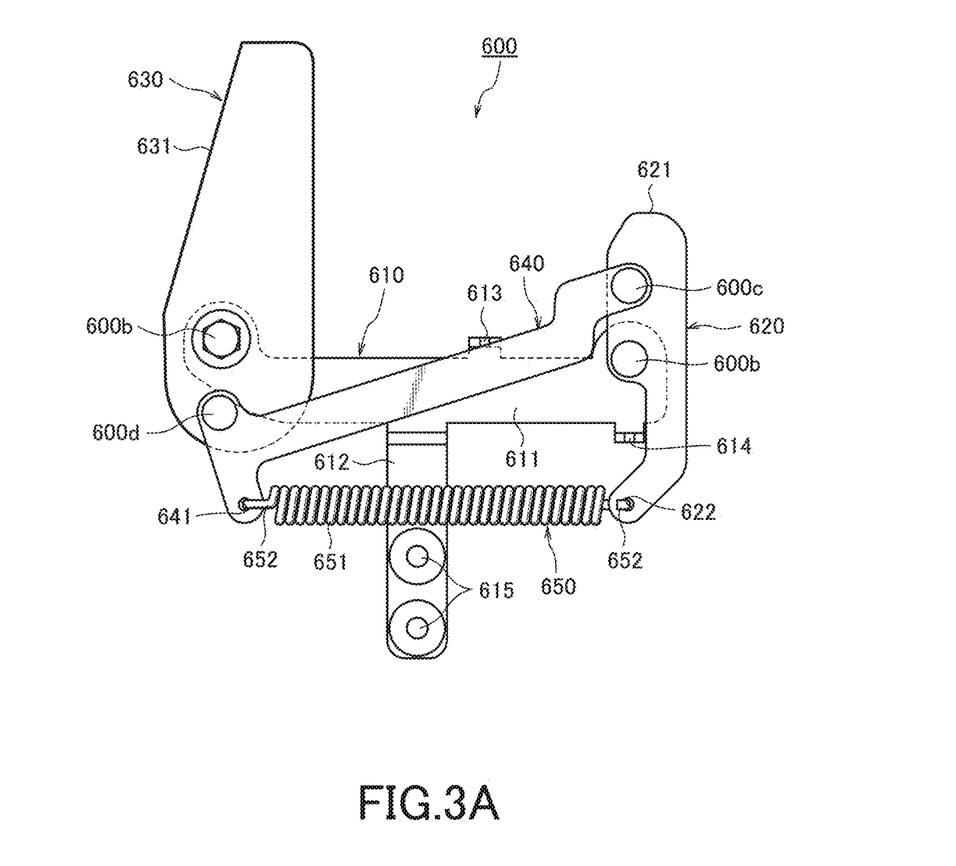
FIG. 3A is a schematic front view illustrating a configuration of a scraping unit according to the present invention.
Figure 3B:
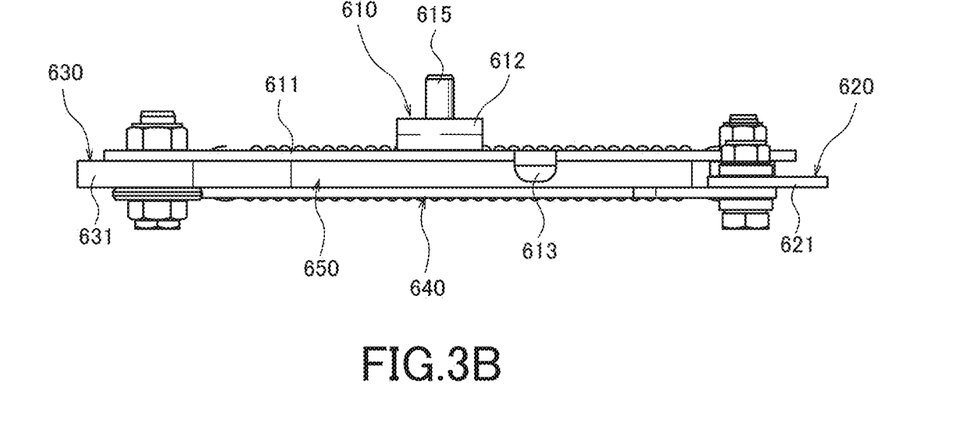
FIG. 3B is a schematic plan view illustrating a configuration of the scraping unit according to the present invention.
Figure 3C:
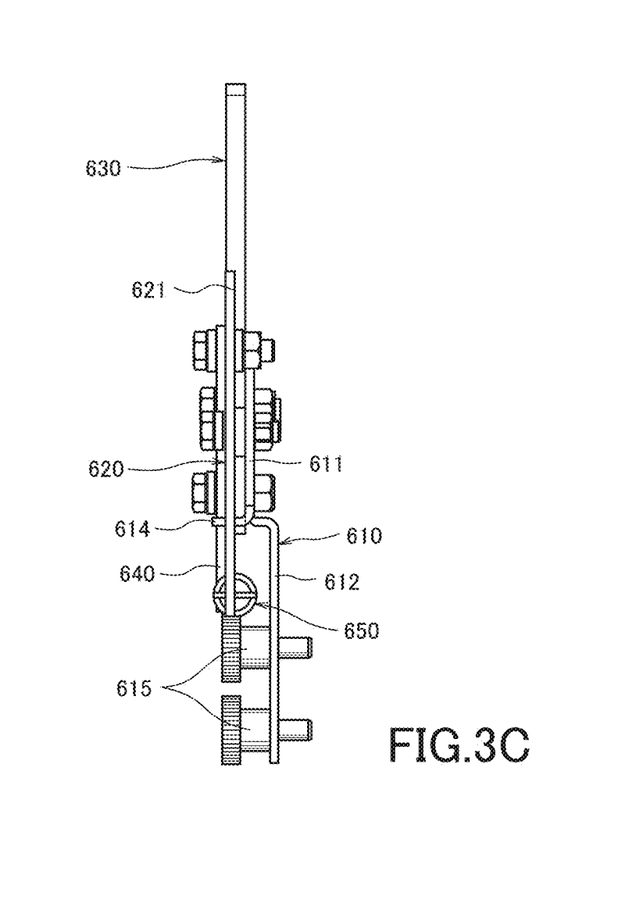
FIG. 3C is a schematic right side view illustrating a configuration of the scraping unit according to the present invention.
Figure 4A:
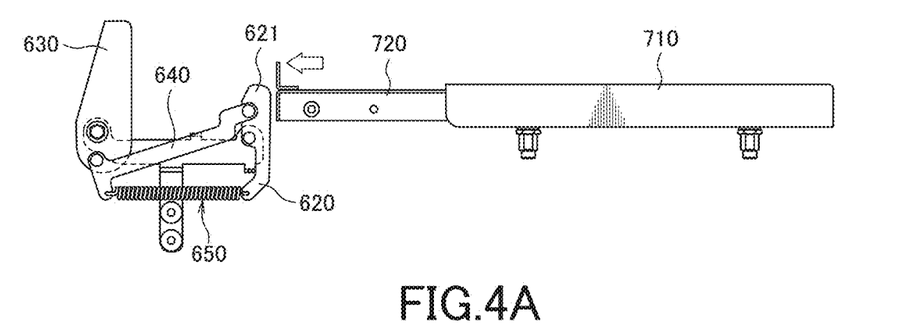
FIG. 4A is a schematic diagram illustrating a state in which a board for plating according to the present invention slides from an open position to a semi-open position.
Figure 4B:
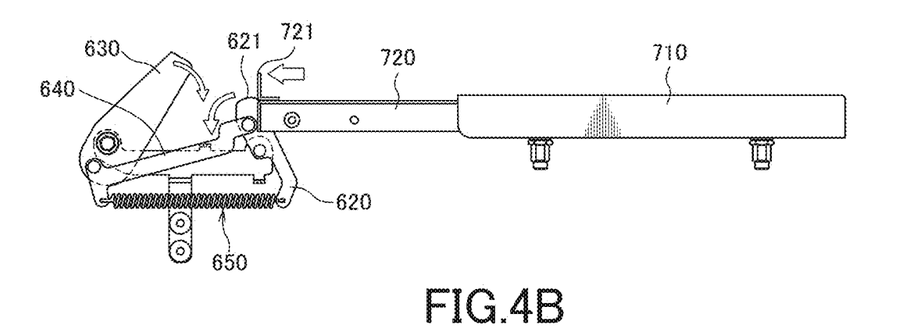
FIG. 4B is a schematic diagram illustrating a state in which the board for plating according to the present invention abuts against a scraper and the scraper is changed from a standing posture to a lying posture.
Figure 4C:
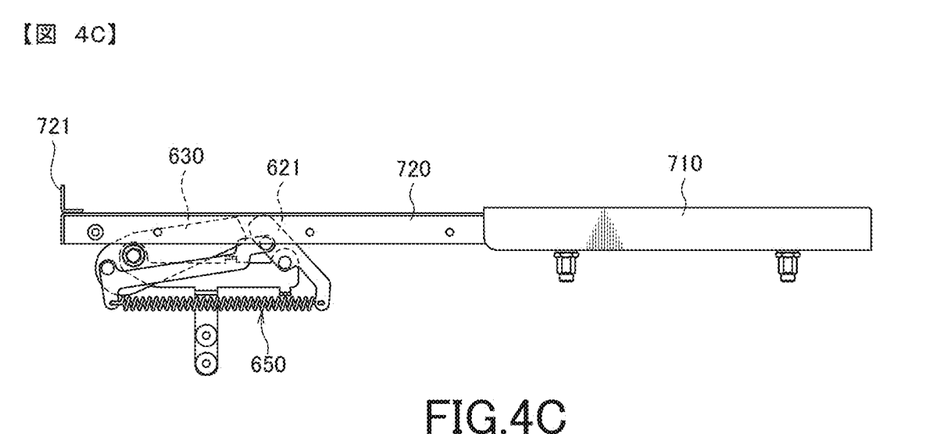
FIG. 4C is a schematic diagram illustrating a state in which the board for plating according to the present invention slides to a closed position and the scraper lies down and is stored.
Figure 4D:
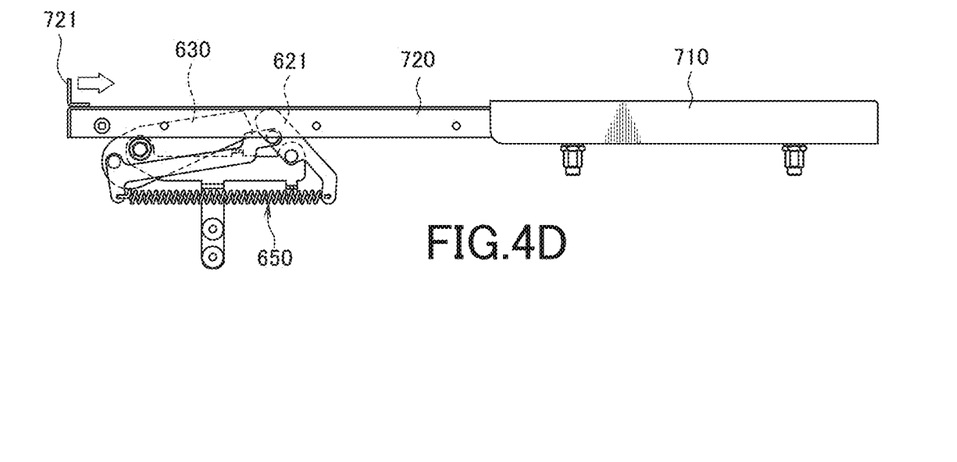
FIG. 4D is a schematic diagram illustrating a state in which the board for plating according to the present invention is at the closed position and the scraper lies down and is stored.
Figure 4E:
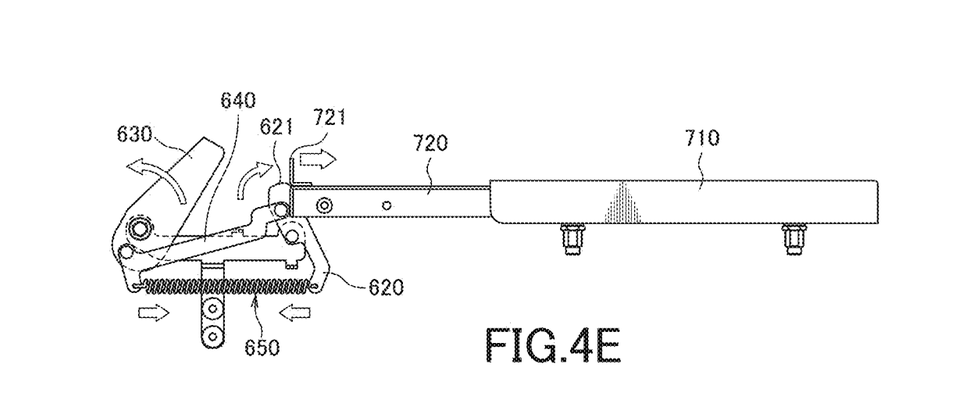
FIG. 4E is a schematic diagram illustrating a state in which the board for plating according to the present invention slides from the closed position to the semi-open position and the scraper is changed from the lying posture to the standing posture.
Figure 4F:
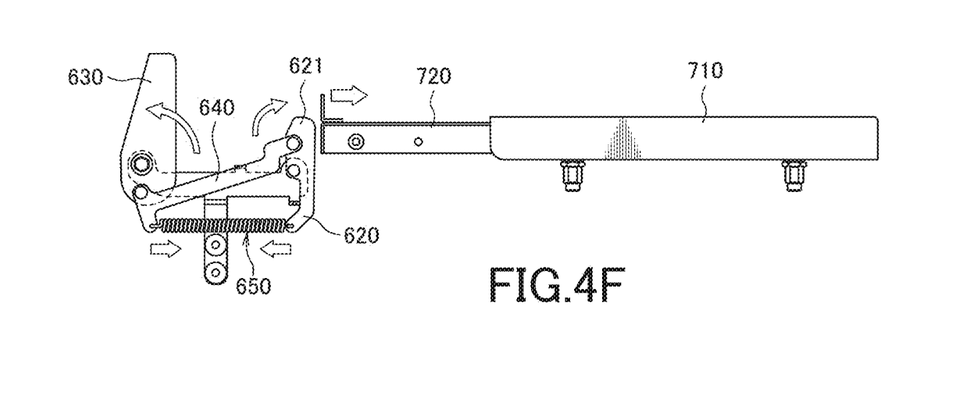
FIG. 4F is a schematic diagram illustrating a state in which the board for plating according to the present invention slides from the semi-open position toward the open position and the scraper stands up.
Figure 5:
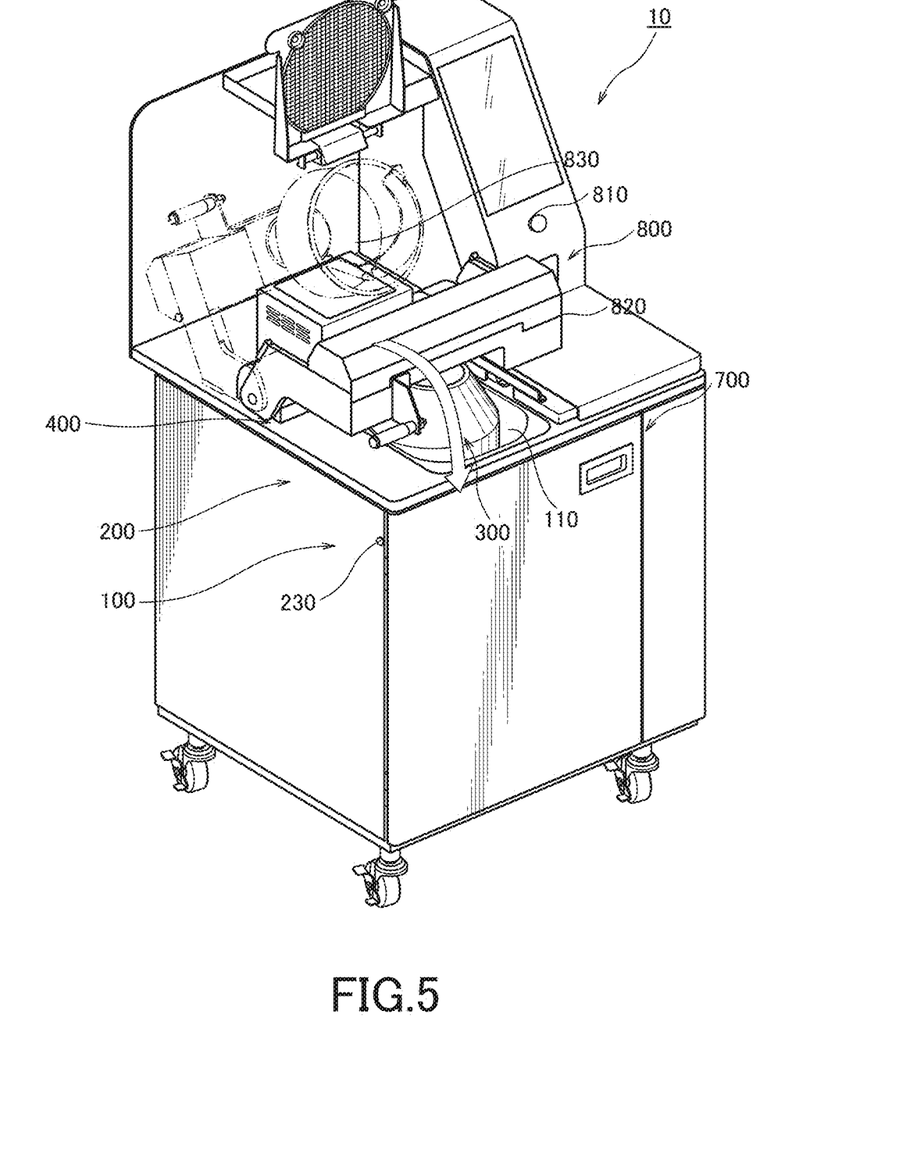
FIG. 5 is a schematic perspective view illustrating a state in which a cooking container according to the present invention has rotated from a cooking position to a washing position.
Figure 6:
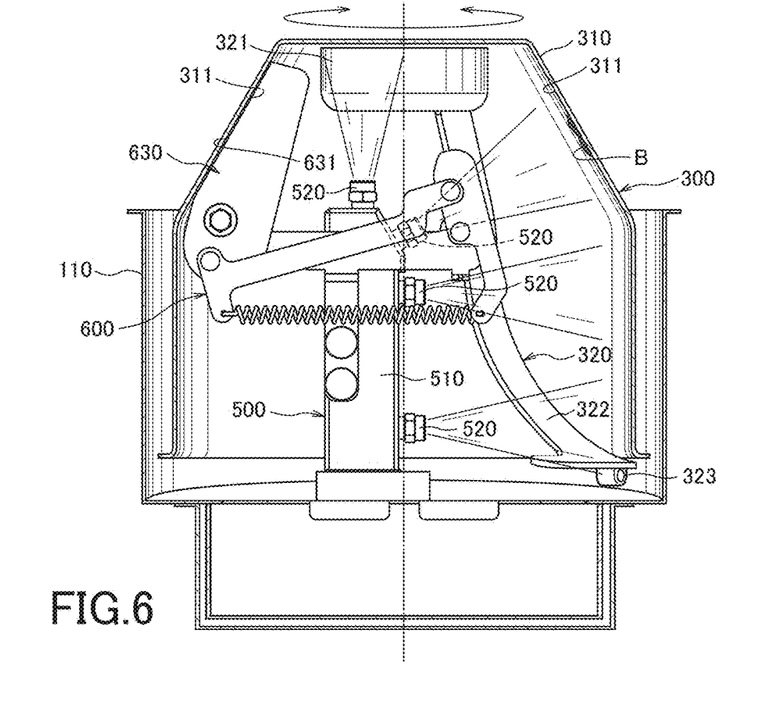
FIG. 6 is a schematic diagram illustrating a state in which the scraper according to the present invention abuts against an inner wall surface of the cooking container at the washing position.
Figure 7:
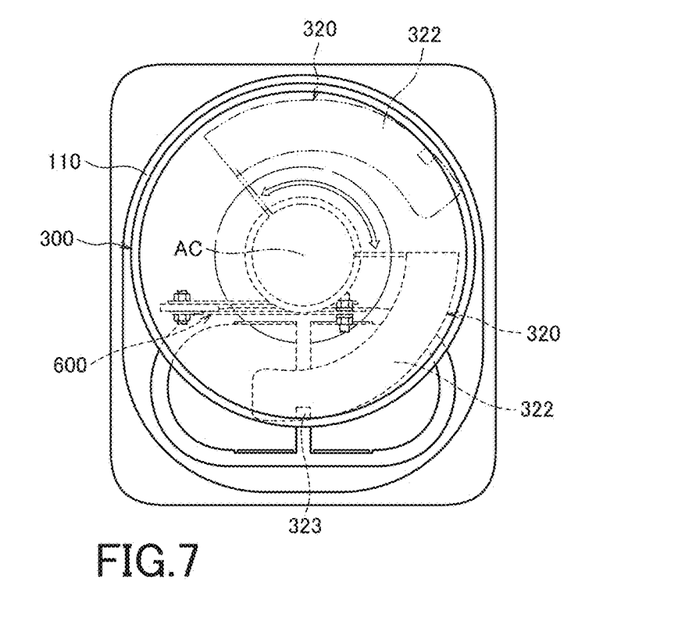
FIG. 7 is a schematic plan view illustrating a relationship between the scraper according to the present invention and a movable range of the stir member during washing.

Then, FIG. 1A is a schematic perspective view illustrating a state of an automated cooking device according to the present invention carrying out automated cooking, FIG. 1B is a schematic perspective view illustrating a state of the automated cooking device according to the present invention with a sink for washing open, FIG. 2 is a schematic left side view illustrating a way of attaching a cooking container to a container holding unit according to the present invention, FIG. 3A is a schematic front view illustrating a configuration of a scraping unit according to the present invention, FIG. 3B is a schematic plan view illustrating a configuration of the scraping unit according to the present invention, FIG. 3C is a schematic right side view illustrating a configuration of the scraping unit according to the present invention, FIG. 4A is a schematic diagram illustrating a state in which a board for plating according to the present invention slides from an open position to a semi-open position, FIG. 4B is a schematic diagram illustrating a state in which the board for plating according to the present invention abuts against a scraper and the scraper is changed from a standing posture to a lying posture, FIG. 4C is a schematic diagram illustrating a state in which the board for plating according to the present invention slides to a closed position and the scraper lies down and is stored, FIG. 4D is a schematic diagram illustrating a state in which the board for plating according to the present invention is at the closed position and the scraper lies down and is stored, FIG. 4E is a schematic diagram illustrating a state in which the board for plating according to the present invention slides from the closed position to the semi-open position and the scraper is changed from the lying posture to the standing posture, FIG. 4F is a schematic diagram illustrating a state in which the board for plating according to the present invention slides from the semi-open position toward the open position and the scraper stands up, FIG. 5 is a schematic perspective view illustrating a state in which a cooking container according to the present invention has rotated from a cooking position to a washing position, FIG. 6 is a schematic diagram illustrating a state in which the scraper according to the present invention abuts against an inner wall surface of the cooking container at the washing position, and FIG. 7 is a schematic plan view illustrating a relationship between the scraper according to the present invention and a movable range of the stir member during washing.

Configuration of Automated Cooking Device

The automated cooking device 10 according to this embodiment is a device configured to cook a food by stirring and cooking an ingredient and includes a cooking counter 100 provided on a floor surface F, a container holding unit 200 pivotally provided on an upper surface of the cooking counter 100 in such a manner as to be capable of rising and falling, a cooking container 300 pivotally held by the container holding unit 200, a container heating unit 400 arranged on the upper surface of the cooking counter 100 and configured to heat the cooking container 300, a container washing unit 500 configured to wash an inner wall surface of the cooking container 300 after cooking, a scraping unit 600 configured to scrape off a dirt, such as a burn sticking to an inner circumferential surface of the cooking container 300 after cooking, a placement unit 700 on which a tableware, such as a plate, on which a plate on which the cooked ingredient is to be plated up is placed, and a control unit 800 configured to control the container holding unit 200, the container heating unit 400, and the container washing unit 500.

As illustrated in FIG. 1A and FIG. 1B, the cooking counter 100 according to this embodiment is a rectangular cuboidal counter provided with casters at the corresponding four corners of a bottom surface thereof and has the flat upper surface.

As illustrated in FIG. 1B, in a near side area, i.e., a front area of the upper surface of the cooking counter 100, a sink for washing 110 is provided, while on a far side, i.e., in a back area of the upper surface of the cooking counter 100, the container holding unit 200 is provided so as to be supported in such a manner as to be capable of rising and falling in a front and back direction.

As illustrated in FIG. 1B and FIG. 2, the container holding unit 200 according to this embodiment includes: a container rotating mechanism 210 to which a container body 310 and a stir member 320 are attached, the container rotating mechanism 210 being provided with a drive motor for rotating the container body 310 and the stir member 320 around a container central axis AC extending in a container depth direction (i.e., a depth direction of the cooking container 300); and a rise-and-fall handle 230 configured such that a cook allows the container holding unit 200 to rise and fall back and forth around a rise-and-fall shaft portion 220 as a pivot axis.

The container rotating mechanism 210 is configured to drive the container body 310 and the stir member 320 using a drive motor such that the container body 310 and the stir member 320 rotate independently of each other around the container central axis AC as a common center of rotation relative to the cooking container 300 to which the container body 310 and the stir member 320 are attached.

As illustrated in FIG. 1A, FIG. 1B, FIG. 2, and FIG. 6, the cooking container 300 according to this embodiment includes the bottomed cylindrical metal container body 310 and the stir member 320.

The container body 310 includes an inclined surface portion to be heated 311 inclined relative to the container central axis AC, a side surface portion 312 continuous with the inclined surface portion to be heated 311 and configured to have a cylindrical shape centered on the container central axis AC and form a circular opening, and a bottom surface portion 313 continuous with the inclined surface portion to be heated 311 and configured to be a flat surface perpendicular to the container central axis AC.

The stir member 320 includes a base portion 321 rotatably arranged on the inner bottom surface portion 313 of the container body 310, a spatula portion 322 connected to the base portion 321 and having such a shape as to correspond to a shape of an inner wall of the container body, and a detection magnet 323 arranged near a tip of the spatula portion 322 and in the exterior of the container body 310.

The cooking container 300 is attached to the container holding unit 200 in such a manner as to be rotatable around the container central axis AC. To attach the cooking container 300, as illustrated in FIG. 2, first, a bottom portion of the container body 310 is placed at a corresponding location on the container rotating mechanism 210, and then, the stir member 320 is placed on the bottom surface portion 313 of the container body 310 in such a manner as to be rotatable independently of the container body 310.

When the stir member 320 is arranged on the bottom surface portion 313 of the container body 310, a magnet coupling mechanism is formed through a strong mutual attraction between an unillustrated permanent magnet provided in the container rotating mechanism 210 and an unillustrated permanent magnet provided in the base portion 321 of the stir member 320, and accordingly the bottom surface portion 313 of the container body 310 is strongly sandwiched between the container rotating mechanism 210 and the base portion 321 of the stir member 320, which stabilizes a state of attachment to the container body 310.

Note that as described later, external dimensions of the cooking container 300 are set to be smaller than dimensions of an opening portion of the sink for washing 110 such that the cooking container 300 can be placed at a lower position than the opening portion of the sink for washing 110 while being in such a washing posture as to be vertically inverted so that an inner surface of the cooking container 300 can be washed.

As illustrated in FIG. 1A, FIG. 1B, and FIG. 2, the container heating unit 400 according to this embodiment is arranged on the upper surface of the cooking counter 100 and at such a position as to face and be spaced apart at a close distance from the inclined surface portion to be heated 311 of the container body 310 of the cooking container 300 in a cooking posture.

In the interior of the container heating unit 400, an induction coil is provided and configured to heat the inclined surface portion to be heated 311 of the container body 310 in the cooking posture using electromagnetic induction.

As illustrated in FIG. 1B and FIG. 6, the container washing unit 500 according to this embodiment is installed in the sink for washing 110 provided in the front area of the cooking counter 100 and includes an upright washing unit body 510 and a plurality of washing nozzles 520 for discharging washing water.

Configuration of Scraping Unit

As illustrated in FIG. 1B, FIG. 3A to FIG. 3C, and FIG. 6, the scraping unit 600 according to this embodiment includes a fixed link 610 configured to support the entirety of the scraping unit 600, an input link 620 configured to receive an external force, a scraper 630 as an output link, a coupling link 640 configured to couple the fixed link 610 and the scraper 630, and a spring for standing 650 configured to apply an elastic force to the fixed link 610 and the coupling link 640 and thus forms a four-joint cross link mechanism with a spring.

The fixed link 610 includes an arm portion 611, a support portion 612, a scraper regulating portion 613, an input link regulating portion 614, and an attachment bolt 615 and is attached to the container washing unit 500 provided in the sink for washing 110 by means of the attachment bolt 615 at the support portion 612.

The input link 620 includes an abutment input portion 621 and a spring hole portion 622 and is rockably coupled at an input fixed joint portion 600a to the arm portion 611 of the fixed link 610.

The scraper 630 has a function as an output link, includes an inclined side portion 631 configured to abut against an inner wall surface of the inclined surface portion to be heated 311 of the container body 310, and is rockably coupled at an output fixed joint portion 600b to the arm portion 611 of the fixed link 610.

The coupling link 640 is rockably coupled at an input movable joint portion 600c to the input link 620 and is rockably coupled at an output movable joint portion 600d to the scraper 630.

The spring for standing 650 includes a spiral coil portion 651 and two attachment portions 652, 652 located at corresponding ends of the coil portion 651, and one attachment portion 652 engages with the spring hole portion 622 of the input link 620, while the other attachment portion 652 engages with a spring hole portion 641 of the coupling link 640.

As described above, the scraping unit 600 according to this embodiment is configured to have a four-joint cross link mechanism, in which when no external force is applied to the abutment input portion 621, an elastic force of the spring for standing 650 causes the input link 620 to rock and be displaced clockwise and such a rocking displacement is transmitted via the coupling link 640 to the scraper 630, and accordingly the scraper 630 rocks and is displaced counterclockwise and assumes a standing posture as illustrated in FIG. 3A.

When rocking and being displaced clockwise, the input link 620 comes into contact with the input link regulating portion 614 of the fixed link 610 and is stopped, which regulates an excessive rocking displacement of the input link 620 and accordingly a power transmission via the coupling link 640 is stopped, so that the scraper 630 is prevented from excessively rocking and being displaced beyond a standing posture.

On the other hand, when a leftward external force is applied to the abutment input portion 621, the input link 620 rocks and is displaced counterclockwise around the input fixed joint portion 600a against an elastic force of the spring for standing 650 and such a rocking displacement is transmitted via the coupling link 640 to the scraper 630, and accordingly the scraper 630 rocks and is displaced clockwise and assumes a lying posture.

When an external force applied to the abutment input portion 621 is large, the scraper 630 rocks vigorously, however, when rocking and being displaced clockwise, the scraper 630 comes into contact with the scraper regulating portion 613 of the fixed link 610 and is stopped, which regulates an excessive rocking displacement so that the scraper 630 is prevented from excessively rocking and being displaced beyond a lying posture.

Configuration of Placement Unit

As illustrated in FIG. 1A, FIG. 1B, and FIG. 4A to FIG. 4F, the placement unit 700 according to this embodiment includes a plate table 710 on which a tableware, i.e., a plate D on which an ingredient I is to be plated up during automated cooking by the cooking container 300 is placed in advance and a board for plating 720 on which the plate D on which the cooked ingredient I is to be plated up is placed, and the placement unit 700 is arranged adjacent to the sink for washing 110 on a near side, i.e., in a front area of the upper surface of the cooking counter 100.

The placement unit 700 is configured to be slidable such that the board for plating 720 which can be stored in the plate table 710 occupies either an open position at which the board for plating 720 leaves the opening portion of the sink for washing 110 open or a closed position at which the board for plating 720 is spanned across the opening portion of the sink for washing 110.

A cook can manually hold a board handling portion 721 of the board for plating 720 and slide the same left and right, thereby placing the board for plating 720 at either the open position or the closed position.

As illustrated in FIG. 1A, FIG. 1B, and FIG. 5, the control unit 800 according to this embodiment includes a display panel 810, an operation part 820, and a spatula portion detecting sensor 830 and is provided on a back side, i.e., in a rear area of the upper surface of the cooking counter 100.

The control unit 800 is configured to display on the display panel 810 a state of the automated cooking device 10 and a content of an operation carried out by a cook and to control an operation of the container rotating mechanism 210 of the container holding unit 200, the container heating unit 400, and the container washing unit 500 in accordance with an instruction from a cook through an operation of the operation part 820, etc.

The control unit 800 is configured to control driving of the container rotating mechanism 210 such that the container body 310 and the stir member 320 of the cooking container 300 rotate independently of each other around the container central axis AC as a common center of rotation.

Further, the control unit 800 is configured to magnetically detect the detection magnet 323 provided to the stir member 320 of the cooking container 300 using the spatula portion detecting sensor 830 and is configured to repeatedly detect that the detection magnet 323 of the stir member 320 rotating around the container central axis AC comes to a reference position facing the spatula portion detecting sensor 830 while the automated cooking device 10 carries out automated cooking in the cooking posture as illustrated in FIG. 1A.

To terminate automated cooking, the control unit 800 controls driving of the container rotating mechanism 210 such that the rotation of the stir member 320 stops when the detection magnet 323 is at a position at which the detection magnet 323 is detected by the spatula portion detecting sensor 830, that is, when the detection magnet 323 of the stir member 320 is at the reference position facing the spatula portion detecting sensor 830.

Further, the control unit 800 has a function of controlling a rotation angle of the stir member 320 from the reference position and is configured to control driving of the container rotating mechanism 210 in such a manner as to allow the stir member 320 to rotate forward or backward by a predetermined angle from the reference position.

Automated Cooking Process

Next, a cooking operation of the automated cooking device 10 will be described.

First, when the automated cooking device 10 is in such a cooking posture as to allow the cooking container 300 to open forward and diagonally upward as illustrated in FIG. 1A, a cook of the automated cooking device 10 feeds an ingredient I to be automatically cooked into the cooking container 300.

Then, when the automated cooking device 10 receives a cooking instruction through an operation of the operation part 820 by a cook, the control unit 800 energizes the container heating unit 400 to apply an alternating current, which causes the container heating unit 400 to emit an alternating magnetic flux with the same frequency as the alternating current toward the cooking container 300, thus generating an induced current in the cooking container 300, so that the cooking container 300 heats up.

Further, the control unit 800 drives the container rotating mechanism 210 of the container holding unit 200 to allow the container body 310 and the stir member 320 of the cooking container 300 to rotate independently of each other around the container central axis AC as a common center of rotation.

The rotation of the container body 310 and the rotation of the stir member 320 interact with each other such that the ingredient I fed into the cooking container 300 is heated in the coking container 300 and stirred and cooked.

Thus, the container heating unit 400 heats the inclined surface portion to be heated 311 of the cooking container 300 in the cooking posture, so that the heating of the ingredient I is carried out mainly on the inner wall surface of the inclined surface portion to be heated 311.

For a plating preparation before or during automated cooking, a tableware for plating, i.e., the plate D can be placed on the plate table 710 of the placement unit 700, and the board for plating 720 can be slid out to such a position as to close the opening portion of the sink for washing 110, thereby allowing the plate D for plating to be placed in advance on the board for plating 720.

After completion of automated cooking, the ingredient can be plated up on the plate D placed on the board for plating 720. Then if it is desirable to leave the opening portion of the sink for washing 110 open immediately after plating up, the plate D on which the ingredient is plated up can be moved for the moment onto the plate table 710, and accordingly the board for plating 720 can be slid to leave the opening portion of the sink for washing 110 open.

When automated cooking is carried out using the above process, seasonings and the like consequently adhere to the inner wall surface of the container body 310, which makes it necessary to wash the inner wall surface of the container body 310. In particular, as illustrated in FIG. 1B and FIG. 6, a dirt B, such as a burn due to heating, may firmly adhere to the inner wall surface of the inclined surface portion to be heated 311, which makes it necessary to carry out not only washing but also scraping to scrape off the dirt B, such as a burn.

Preparation for Scraping

Next, a preparation of the scraping unit 600 for scraping the cooking container 300 will be described.

Note that as described above, the scraping unit 600 according to this embodiment is attached to the container washing unit 500 installed in the sink for washing 110 as illustrated in FIG. 1B. Further, as illustrated in FIG. 1A and FIG. 1B, the placement unit 700 is provided with the plate table 710 and the board for plating 720, is disposed adjacent to the sink for washing 110, and is configured such that the board for plating 720 can slide between the open position at which the board for plating 720 leaves the opening portion of the sink for washing 110 open and the closed position at which the board for plating 720 is spanned across the opening portion of the sink for washing 110.

Such a relationship of arrangement between the scraping unit 600 and the board for plating 720 allows the board for plating 720 and the abutment input portion 621 to be separated from each other as illustrated in FIG. 4A until the board for plating 720 is slid from the open position of the sink for washing 110 to a semi-open position and thus no external force is applied to the scraping unit 600, and accordingly, each scraper 630 is in a standing posture due to an elastic force of the spring for standing 650.

When the board for plating 720 is slid beyond the semi-open position, the board handling portion 721 of the board for plating 720 comes into contact with the abutment input portion 621 from the right as illustrated in FIG. 4B, and accordingly, against an elastic force of the spring for standing 650, each of the input link 620 and the scraper 630 rocks and is displaced in such a direction as to lie down.

When the board for plating 720 is slid to the closed position of the sink for washing 110, the scraper 630 of the scraping unit 600 falls against the spring for standing 650 into a lying posture as illustrated in FIG. 4C. Thus, merely sliding the board for plating 720 to the closed position of the sink for washing 110 allows the scraper 630 to be stored in a lying posture under the board for plating 720.

Consequently, when automated cooking is completed, the plate D which is a tableware for plating can be stably placed on the board for plating 720 at the closed position of the sink for washing 110 and thus plating work can be carried out.

During plating work, the board for plating 720 is at the closed position and as illustrated in FIG. 4D, the abutment input portion 621 of the input link 620 of the scraping unit 600 abuts against a lower surface of the board for plating 720 and receives an external force in a downward left direction, so that the scraper 630 lies down and is stored under the board for plating 720 in the sink for washing 110.

To carry out scraping of the cooking container 300, it is necessary to slide the board for plating 720 to the open position of the sink for washing 110, and accordingly the plate D on which an ingredient is already plated up is moved for the moment onto the plate table 710, etc.

Then, the board for plating 720 is gradually slid in such a direction as to be stored in the plate table 710 and the sink for washing 110 accordingly becomes semi-open, which forms a positional relationship in which as illustrated in FIG. 4E, the abutment input portion 621 becomes separated from the lower surface of the board for plating 720 and abuts against the board handling portion 721 of the board for plating 720 from horizontally leftward, which consequently produces such an effect that an elastic force of the spring for standing 650 allows each of the input link 620 and the scraper 630 to rock and be displaced in such a direction as to stand up, while the input link 620 applies a rightward force to the board for plating 720 to allow the board for plating 720 to slide to the right.

When the board for plating 720 is further slid in such a direction as to be stored in the plate table 710, as illustrated in FIG. 4F, the board for plating 720 and the abutment input portion 621 are separated from each other, and an elastic force of the spring for standing 650 causes the input link 620 and the scraper 630 to rock and be displaced so as to stand up and stop.

When the board for plating 720 is slid further and stored in the plate table 710, in other words, when the board for plating 720 is slid to the open position of the sink for washing 110, then the opening portion of the sink for washing 110 is left completely open, so that scraping is ready.

Thus, the area of the cooking counter 100 forward of the container holding unit 200 has both a scraping function provided by the scraping unit 600 in the sink for washing 110 and a plate placement function provided by the board for plating 720 spanned across the sink for washing 110, which makes the entire device compact.

Scraping Process

After the scraper 630 of the scraping unit 600 becomes upright and scraping is ready, as illustrated in FIG. 5, a cook pulls the rise-and-fall handle 230 of the container holding unit 200 forward and allows the container holding unit 200 to rock around the rise-and-fall shaft portion 220 so as to fall forward, whereby as illustrated in FIG. 6, the cooking container 300 is placed in the sink for washing 110 in the washing posture in which the cooking container 300 is turned upside down, namely, with the opening of the cooking container 300 facing downward.

Then, the scraper 630 in the standing posture due to an elastic force of the spring for standing 650 comes into contact with the inner wall surface of the container body 310 of the cooking container 300 and receives an external force, which causes a rocking displacement toward the lying posture.

In this case, an elastic force of the spring for standing 650 of the scraping unit 600 resists using an elastic force thereof an external force applied from the inner wall surface of the container body 310 of the cooking container 300, so that the scraper 630 elastically abuts against the inner wall surface of the container body 310 and an excessive relative sliding state of the scraper 630 against the inner wall surface of the cooking container 310 can be avoided to suppress wear thereof and damage thereto.

Moreover, the scraper 630 includes the inclined side portion 631 configured to abut against the inner wall surface of the inclined surface portion to be heated 311 of the container body 310 of the cooking container 300, so that in the washing position, when the control unit 800 drives the container rotating mechanism 210 of the container holding unit 200 to allow the container body 310 of the cooking container 300 to rotate around the container central axis AC, the inclined side portion 631 of the scraper 630 abuts against the entire circumference of the inner wall surface of the inclined surface portion to be heated 311, and thus the firmly sticking dirt B, such as a burn due to heating and cooking is scraped off from the entire circumference of the inner wall surface of the inclined surface portion to be heated 311.

Further, the scraping unit 600 exhibits a scraping function in a space surrounded by the inner wall surface upside down of the container body 310 of the cooking container 300 placed in the sink for washing 110, so that the dirt B, such as a burn scraped off by the scraper 630 after cooking falls down from the inner wall surface of the cooking container 300 into the sink for washing 110 without scattering on the upper surface of the cooking counter 100, and accordingly, the dirt B, such as a burn scraped off can be easily collected after washing.

The scraping unit 600 according to this embodiment is configured to be detachably attached to the sink for washing 110, and more specifically, is attached to the container washing unit 500 provided in the sink for washing 110 by means of the attachment bolt 615 at the support portion 612 of the fixed link 610.

Thus, the scraping unit 600 can be detached after scraping off the dirt B, such as a burn sticking to the inner wall surface of the container body 310 of the cooking container 300, and consequently the detached scraping unit 600 itself can be easily washed.

Washing Process

In the automated cooking device 10 according to this embodiment, the scraping unit 600 carries out scraping of the cooking container 300 in the washing posture, and at the same time, the container washing unit 500 carries out washing thereof.

As illustrated in FIG. 1B and FIG. 6, the container washing unit 500 according to this embodiment includes the upright washing unit main body 510 and the plurality of washing nozzles 520 for discharging washing water and is installed in the sink for washing 110 provided in the front area of the cooking table 100.

As illustrated in FIG. 6, the plurality of washing nozzles 520 are provided to the washing unit body 510 such that washing water is discharged upward, diagonally right-upward, and rightward to respectively correspond to the inner surface wall of the bottom surface portion 313, the inclined surface portion to be heated 311, and the side surface portion 312 of the container body 310 upside down in the washing posture.

When receiving a washing command based on an operation of the operation part 820 by a cook, the control unit 800 energizes the container washing unit 500 and controls ON/OFF of an unillustrated pump, thereby allowing the plurality of washing nozzles 520 of the container washing unit 500 to discharge washing water in respective directions, and at the same time, the control unit 800 drives the container rotating mechanism 210 of the container holding unit 200 to allow the container body 310 and the stir member 320 of the cooking container 300 to rotate independently of each other around the container central axis AC as a common center of rotation, so that the container body 310 and the stir member 320 of the cooking container 300 can be washed together.

Note that in the automated cooking process, seasonings and the like are apt to adhere to the spatula portion 322 of the stir member 320, and accordingly in the washing process, it is preferable that the spatula portion 322 of the stir member 320 is reliably washed using washing water discharged from the washing nozzles 520.

Thus, in this embodiment, when, by manually operating the above-mentioned rise-and-fall handle 230, the container holding unit 200 is rocked around the rise-and-fall shaft portion 220 after automated cooking and allowed to fall forward to place the cooking container 300 in the washing posture in the sink for washing 110, the control unit 800 controls driving of the container rotating mechanism 210 such that the stir member 320 rotates in a reciprocating manner in a range counterclockwise from a 0 degree position (broken line in FIG. 7) as a reference position at which the stir member 320 stopped at the end of cooking to a 125 degree position (two-dot chain line in FIG. 7).

The stir member 320 rotates in a reciprocating manner within the above-mentioned range, so that from among washing water discharged from the plurality of washing nozzles, washing water discharged diagonally right-upward and rightward is always sprayed onto some part of the spatula portion 322 of the stir member 320.

Further, the rotation of the stir member 320 driven by the container rotating mechanism 210 is controlled by the control unit 800 as described above, which consequently restricts a movable range of the stir member 320 during washing.

As illustrated in FIG. 7, the scraping unit 600 is attached to the container washing unit 500 in such a manner as to be positioned outside of the movable range the stir member 320.

Thus, the scraping unit 600 is positioned outside of a movable range of the stir member 320, so that during the washing process in which in the washing posture in which the cooking container 300 faces down toward the sink for washing 110, the cooking container 300 is rotated by the container rotating mechanism 210 and thus washed, the stir member 320 and the scraping unit 600 are always positioned spaced apart from each other, which can prevent damage due to contact between the stir member 320 and the scraping unit 600, and the clearance between the agitating member 320 and the scraping unit 600 allows for high maintainability.

Further, the scraping unit 600 is positioned outside of a movable range of the stir member 320, particularly when viewed from above, so that the stir member 320 stops at some position due to an emergency stop for some reason during washing in which the cooking container 300 is turned upside down in the washing posture, the cooking container 300 can be returned from the washing posture to a cooking posture and recovery work can be carried out while no interference between the stir member 320 and the scraping unit 600 is caused.

| Reference Signs List | |
|---|---|
| 10 | automated cooking device |
| 100 | cooking counter |
| 110 | sink for washing |
| 200 | container holding unit |
| 210 | container rotating mechanism |
| 220 | rise-and-fall shaft portion |
| 230 | rise-and-fall handle |
| 300 | cooking container |
| 310 | container body |
| 311 | inclined surface portion to be heated |
| 312 | side surface portion |
| 313 | bottom surface portion |
| 320 | stir member |
| 321 | base portion |
| 322 | spatula portion |
| 323 | detection magnet |
| 400 | container heating unit |
| 500 | container washing unit |
| 510 | washing unit body |
| 520 | washing nozzle |
| 600 | scraping unit (four-joint cross link mechanism with spring) |
| 600a | input fixed joint portion |
| 600b | output fixed joint portion |

| | Reference Signs List |
|---|---|
| 600c | input movable joint portion |
| 600d | output movable joint portion |
| 610 | fixed link |
| 611 | arm portion |
| 612 | support portion |
| 613 | regulating portion |
| 614 | input link regulating portion |
| 615 | attachment bolt |
| 620 | input link |
| 621 | abutment input portion |
| 622 | spring hole portion |
| 630 | scraper |
| 631 | inclined side portion |
| 640 | coupling link |
| 641 | spring hole portion |
| 650 | spring for standing |
| 651 | coil portion |
| 652 | attachment portion |
| 700 | placement unit |
| 710 | plate table |
| 720 | board for plating |
| 721 | board handling portion |
| 800 | control unit |
| 810 | display panel |
| 820 | operation part |
| 830 | spatula portion detecting sensor |
| F | floor surface |
| I | ingredient |
| D | plate |
| B | dirt such as burn |
| AC | container central axis |

The invention claimed is:

1. An automated cooking device comprising:
a cooking counter including an upper portion;
a cooking container including a container body, and inner wall surface, and a stir member, wherein the container body is configured to contain an ingredient, wherein the stir member is attached to the container body and configured to rotate independently of the container body, and wherein the cooking container is a bottomed cylindrical cooking container;
a container holding unit including a rise-and-fall shaft and a handle, wherein the container holding unit is provided on the upper portion of the cooking counter and configured to hold the cooking container rotatably around a container central axis in a container depth direction, and wherein the handle is configured to assist in moving the container holding unit to rise and fall back and forth around the rise-and-fall shaft as a pivot axis, wherein the container holding unit allows the stir member to rotate independently of the container body;
a sink for washing provided in an area of the cooking counter forward of the rise-and-fall shaft of the container holding unit;
a container heating unit including a heater such that the automated cooking device is configured to heat the ingredient contained in the cooking container while stirring the ingredient using the stir member;
a container washing unit arranged in the sink for washing and including a plurality of washing nozzles configured to wash the inner wall surface of the cooking container while the cooking container is turned upside down using the handle to move the container holding unit; and
a scraping unit attached to the container washing unit and including a scraper configured to scrape off a dirt adhering to the cooking container after cooking, wherein the scraper is provided in such a manner as to be enclosed by the inner wall surface of the cooking container when the cooking container is arranged in the sink for washing, allowing the inner wall surface of the cooking container and the scraper to abut against each other,
wherein the scraping unit is arranged outside of a movable range of the stir member during washing.

2. The automated cooking device according to claim 1, characterized in that the cooking container has an inclined surface portion to be heated inclined relative to the container central axis, and the scraper has an inclined side portion configured to abut against an inner wall surface of the inclined surface portion to be heated of the container body.

3. The automated cooking device according to claim 1, characterized in that the scraping unit is configured to be detachably attached to the sink for washing.

4. An automated cooking device comprising:
a cooking counter including an upper portion;
a cooking container including a container body, and inner wall surface, and a stir member, wherein the container body is configured to contain an ingredient, wherein the stir member is attached to the container body and configured to rotate independently of the container body, and wherein the cooking container is a bottomed cylindrical cooking container;
a container holding unit including a rise-and-fall shaft and a handle, wherein the container holding unit is provided on the upper portion of the cooking counter and configured to hold the cooking container rotatably around a container central axis in a container depth direction, and wherein the handle is configured to assist in moving the container holding unit to rise and fall back and forth around the rise-and-fall shaft as a pivot axis;
a sink for washing provided in an area of the cooking counter forward of the rise-and-fall shaft of the container holding unit;
a container heating unit including a heater such that the automated cooking device is configured to heat the ingredient contained in the cooking container while stirring the ingredient using the stir member;
a container washing unit arranged in the sink for washing and including a plurality of washing nozzles configured to wash the inner wall surface of the cooking container while the cooking container is turned upside down using the handle to move the container holding unit;
a scraping unit attached to the container washing unit and including a scraper configured to scrape off a dirt adhering to the cooking container after cooking, wherein the scraper is provided in such a manner as to be enclosed by the inner wall surface of the cooking container when the cooking container is arranged in the sink for washing, allowing the inner wall surface of the cooking container and the scraper to abut against each other, and
a placement unit including a board for plating a plate with the cooked ingredient, wherein the placement unit is provided near the sink for washing such that the board for plating can slide between an open position at which the board for plating leaves an opening portion of the sink for washing open, and a closed position at which the board for plating is spanned across the opening portion of the sink for washing, wherein an opening and closing movement of the board for plating relative to the opening portion of the sink for washing causes the scraper to stand up at the open position and the scraper to lie down at the closed position.

5. The automated cooking device according to claim 4, characterized in that the scraping unit has a four-joint cross link mechanism with a spring, and the scraper of the scraping unit assumes a standing posture due to an elastic force of a spring for standing of the four-joint cross link mechanism with a spring when the board for plating is at the open position and assumes a lying posture against an elastic force of the spring for standing of the four-joint cross link mechanism with a spring when the board for plating is at the closed position.

* * * * *